United States Patent
Schulz et al.

(10) Patent No.: US 10,031,642 B2
(45) Date of Patent: Jul. 24, 2018

(54) TAB CONTROL WITH A VARIABLE TEXT ENTRY TAB

(71) Applicant: SNOWFLAKE COMPUTING, INC., San Mateo, CA (US)

(72) Inventors: Egan Schulz, San Jose, CA (US); Brian Joseph Zeitler, Santa Clara, CA (US)

(73) Assignee: Snowflake Computing, Inc., San Mateo, CA (US)

( * ) Notice: Subject to any disclaimer, the term of this patent is extended or adjusted under 35 U.S.C. 154(b) by 223 days.

(21) Appl. No.: 14/455,670

(22) Filed: Aug. 8, 2014

(65) Prior Publication Data

US 2016/0041739 A1 Feb. 11, 2016

(51) Int. Cl.
*G06F 3/0481* (2013.01)
*G06F 3/0482* (2013.01)

(52) U.S. Cl.
CPC ........ *G06F 3/04817* (2013.01); *G06F 3/0482* (2013.01)

(58) Field of Classification Search
CPC ............ G06F 3/04847; G06F 3/04842; G06F 3/0481–3/0482; G06F 9/4443
USPC ........................................................ 715/777
See application file for complete search history.

(56) References Cited

U.S. PATENT DOCUMENTS

| | | | | |
|---|---|---|---|---|
| 8,886,735 B1* | 11/2014 | Liu | ...................... | G06Q 10/107 709/206 |
| 2003/0197735 A1* | 10/2003 | Woltzen | ............. | G06F 17/3089 715/777 |
| 2009/0327947 A1* | 12/2009 | Schreiner | ............. | G06F 3/0483 715/777 |
| 2013/0326392 A1* | 12/2013 | Maltesson | ............ | G06F 3/0488 715/780 |
| 2014/0223382 A1* | 8/2014 | Hicks | ................. | G06F 3/04883 715/863 |

OTHER PUBLICATIONS

About Tab Controls; Microsoft; Sep. 6, 2011; https://web.archive.org/web/20120109084813/http://msdn.microsoft.com/en-us/library/windows/desktop/bb760550(v=vs.85).aspx.*
HTML5, Jun. 17, 2014, pp. 49-50, http://www.w3.org/TR/2014/WD-html5-20140617/forms.html.*
iOS 5 Development—11—Segmented Controls; Dani Arnaout; Nov. 25, 2011; https://www.youtube.com/watch?v=Dh5Di5UjV24.

* cited by examiner

*Primary Examiner* — Roland J Casillas
(74) *Attorney, Agent, or Firm* — Haynes and Boone, LLP (57) ABSTRACT

Methods and systems for configuring a tab in a tab control are described. An application creates the tab control, and the user is presented with a tab control including multiple tabs. At least one special tab includes a text label that suggests it can be user defined, such as "Other." When the user presses this tab, the tab shows a pressed state momentarily and then morphs into a text field. The user can then type in text, and the text is recorded for that tab. If the user decides that he or she wants to change the text in the special tab, the user can select the special tab again to enter new text.

12 Claims, 6 Drawing Sheets

TAB CONTROL WITH A VARIABLE TEXT ENTRY TAB

BACKGROUND

Field of the Invention

The present invention generally relates to tab controls, and more particularly to configuring tabs in the tab controls.

Related Art

In interface design, a tab is a graphical control element that allows multiple documents or panels to be contained within a single window, using the tabs as a navigational widget for switching between content. One kind of tab control is embodied in a tab bar, which can take the form of a horizontal bar with multiple tabs. A tab bar can dynamically switch the content that appears according to the selected tab. Another kind of tab control is the segmented control. A segmented control is a horizontal control made of multiple segments (or tabs), each segment functioning as a discrete button. Segmented controls allow users to interact with a compact group of a number of controls.

The different tabs in a tab control may be configured in different ways. For example, if the control has only a few items, a tab selector can be provided that shows all the items that may be selected for the tabs. The tab selector, however, is only good when the control has just a few items.

Content for each tab may also be set individually with a user defined variable. For example, a user may be presented with a pop-up window with a built-in text field for the user defined variable. In another example, if a button is pressed, an associated text field for the user to type the variable in may be created. An additional window or text field, however, often clutters the layout of a screen, or can make the dialog wider or taller.

Thus, a need exists for systems and methods that allow a user to configure tabs on a tab control on a cleaner user interface.

Embodiments of the present disclosure and their advantages are best understood by referring to the detailed description that follows. It should be appreciated that like reference numerals are used to identify like elements illustrated in one or more of the figures, wherein the features shown in the figures are for purposes of illustrating embodiments of the present disclosure and not for purposes of limiting the same.

DETAILED DESCRIPTION

The present disclosure describes systems and methods that provide tab controls that include at least one tab that can transform into a text field that can accept a variable when it is selected. A tab control displays a list of options or controls that a user can choose from. The control provides a compact way to group several tabs together. Each tab may look like a button, a segment, a divider in a notebook, or a label in a file cabinet. A tab remains "pressed" even after the user selects the control.

When a user presses a tab, the pressed tab remains highlighted and the data corresponding to the tab is displayed. Tab controls can be used when a user wants to show or hide particular data without changing the current view. Tab controls work as a filter on a set of data.

In an exemplary embodiment, a user decides to create and configure a tab control. An application creates the tab control, and the user is presented with a tab control including multiple tabs. At least one special tab includes a text label that suggests it can be user defined, such as "Other." When the user presses this tab, the tab shows a pressed state momentarily and then morphs or changes into a text field. The tab can include an indication that text can be typed into the tab, such as an I-beam pointer or cursor. Command text may also appear in the background of the tab such as "Type Here" or 'Type Value Here." The user can then type or otherwise enter in text, and the text is recorded for that tab. If the user decides that he or she wants to change the text in the special tab, the text can be changed by selecting the special tab again, which would cause the special tab to become editable again. The user can then type new text in the special tab, and the new text is recorded for that tab. It should be understood that "text" as used herein encompasses words, numbers, symbols, etc. Advantageously, the user can change text in the special tab to any value he or she desires without opening a burdensome new window or cluttering up the user interface. Moreover, allowing the user to change text directly in the special tab rather than a separate window is more intuitive.

The present systems and methods are particularly useful when a user needs to fill out a form to create a tab control and specify several preferences and settings for the tab control. Generally, the content for each tab can be set individually, although some of the tabs may be configured with pre-set content. In the case where the user has to configure the content of many tabs, it is a hassle for the user to open up a separate window for each tab and enter text in the window for each tab. It is much simpler for the user to stay within one window that displays the tab control and to change the text in that one window.

Figure 1:
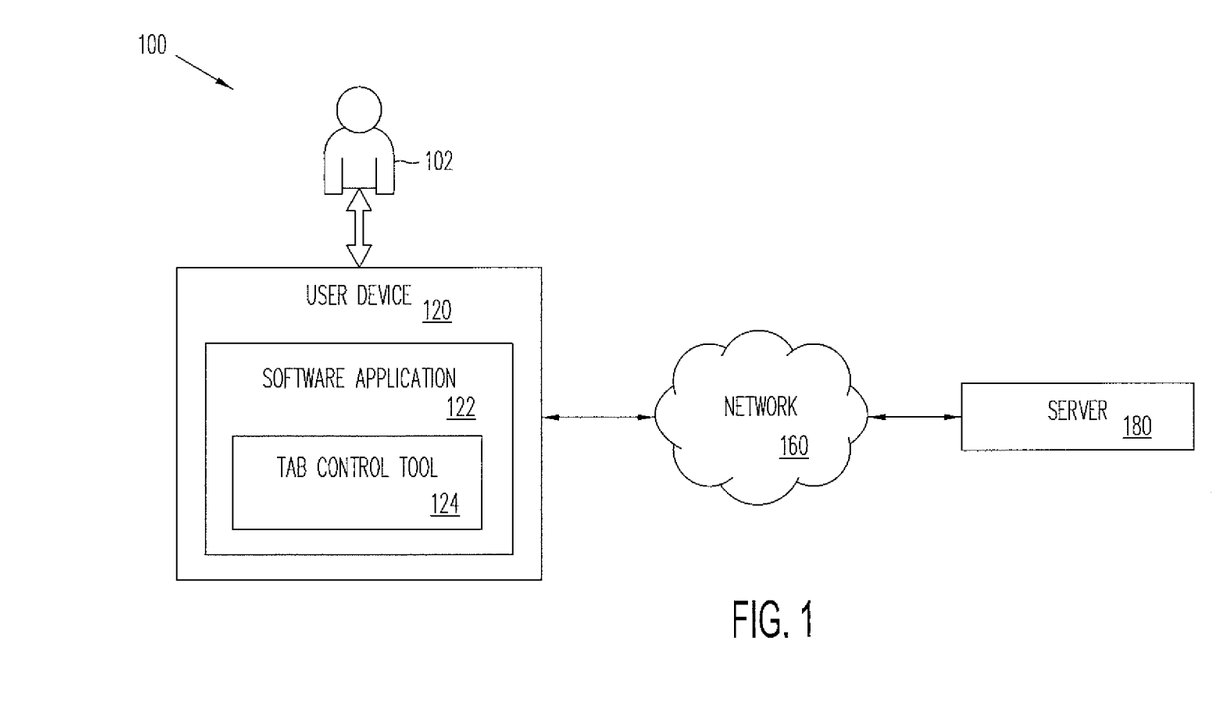
FIG. 1 is a block diagram illustrating a system for the configuration of a tab in a tab control according to an embodiment of the present disclosure.

FIG. 1 shows one embodiment of a block diagram of a network-based system 100 adapted for the configuration of a tab in tab control with a user device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a. MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a user device 120 (e.g., a computer) and at least one server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 120, in one embodiment, may be utilized by the user 102 to interact with the server 180 over the network 160. In various implementations, the user device 120 includes a wireless telephone (e.g., cellular or mobile phone), a tablet, a personal computer, a notebook computer, a wearable computing device, and/or various other generally known types of wired and/or wireless computing devices.

The user device 120 includes a software application 122 that includes a tab control tool 124. The tab control tool 124 may consist of one or more software applications, programs, modules, procedures, or other computer code to include firmware and may additionally include stored data that may be part of the software application 122, where it presents a tab control for a user interface that implements the tab control functionality described herein. In the embodiment shown in FIG. 1, the tab control tool 124 is part of the software application 122 and resides on server 180. In other embodiments, the software application 122 and/or the tab control tool 124 may reside on one or more servers, computers, or other hardware platforms of the system 100. The tab control tool 124 may consist of one or more initiation modules, command modules, and/or selection modules according to an embodiment.

In the embodiment of FIG. 1, the server 180 is connected to the user device 120 by the network 160. The software application 122 and the tab control tool 124 may be stored on the server 180 and are loaded, in whole or in part, to the user device 120 over the network 160 when the user 102 initiates or otherwise calls the software application 122. The software application 122 presents the graphical user interface on the user device 120. In other embodiments, the software application 122 may be loaded on a single computer instead of the system 100 or the software application 122 and/or the selection tool 124 may be stored in whole or in part on both the user device 120 and the server 180. The system 100 shown is only one possible implementation of the tab control tool 124 in conjunction with the software application 122.

Figure 2:
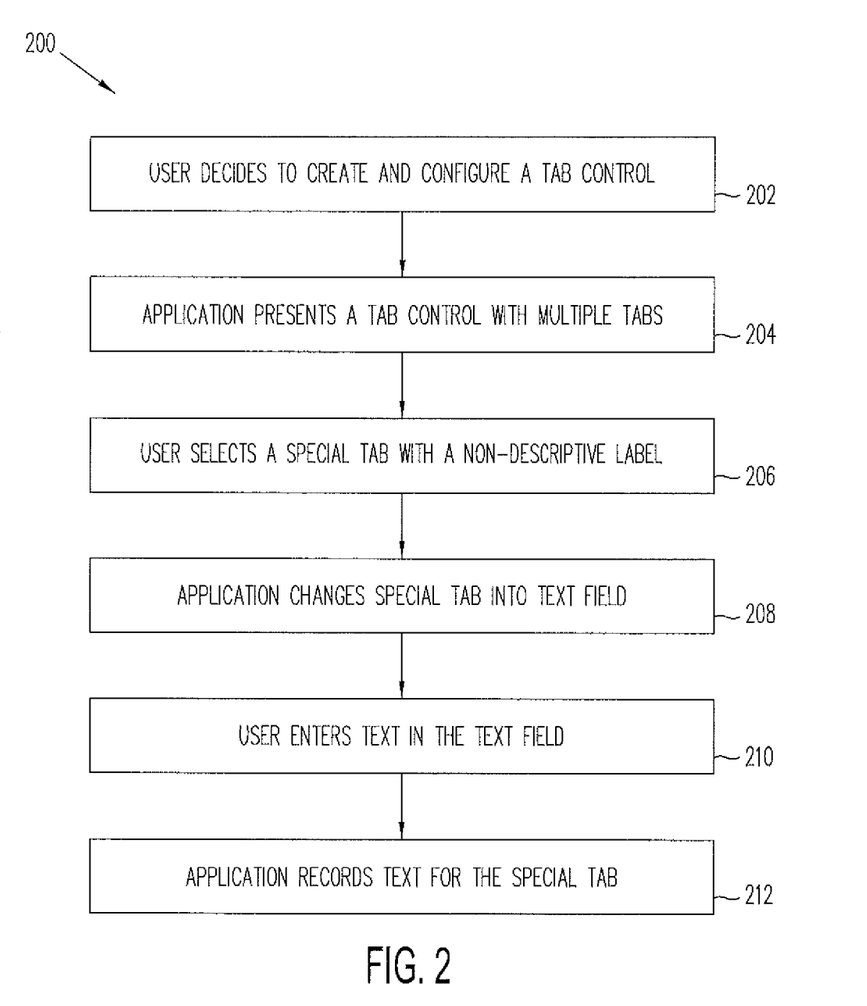
FIG. 2 is a flowchart showing a method for configuring a tab in a tab control according to an embodiment of the present disclosure.

Referring now to FIG. 2, a flowchart 200 of a method of configuring a tab in a tab control is illustrated according to an embodiment of the present disclosure. At step 202, the user 102 decides to create and configure a tab control. For example, the user 102 may want to include a tab control as part of a user interface for an application.

Figure 3A:
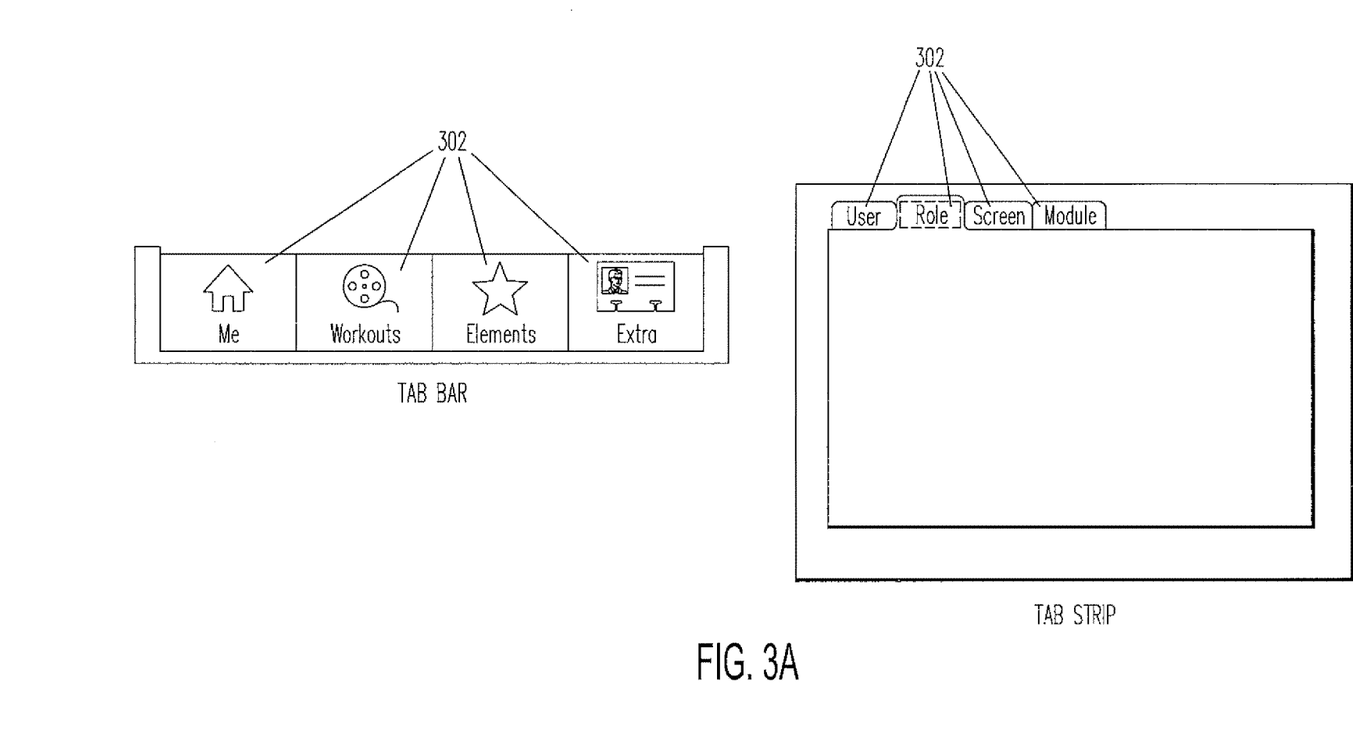
FIGS. 3A-3B illustrate examples of tab controls.
Figures 3B, 4A:
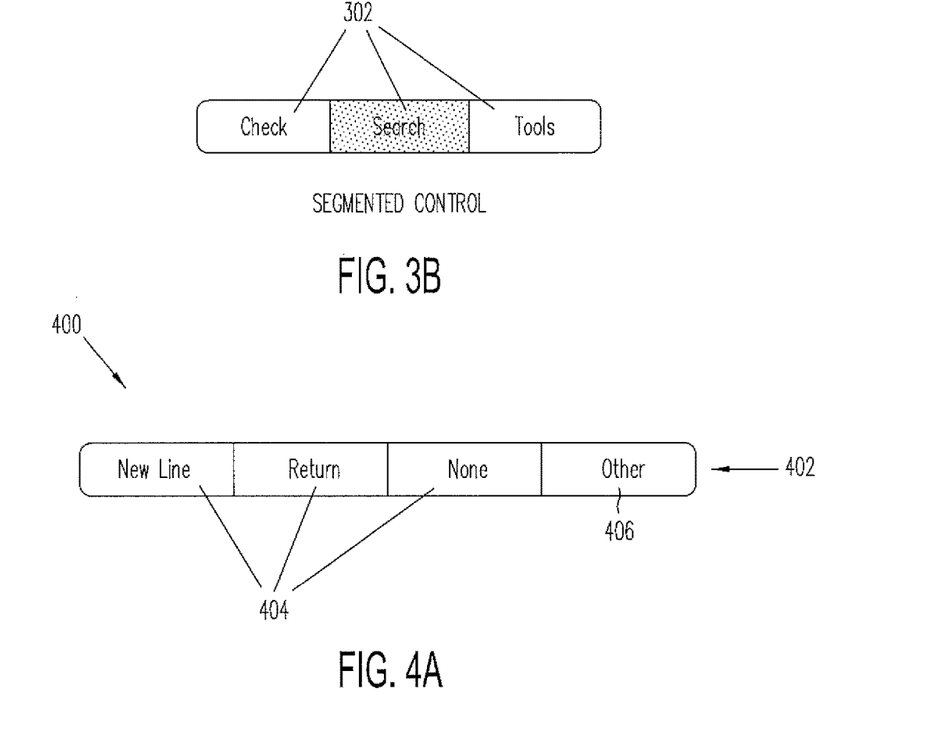
FIGS. 4A-4E are screenshots that illustrate a configuration of a segment in a segmented control according to an embodiment of the present disclosure.

The tab control may be in the form of a tab bar or tab strip having multiple tabs or buttons 302 as illustrated in FIG. 3A, or a segmented control having multiple segments 302 as shown in FIG. 3B. The tabs (e.g., buttons or segments) are individually associated with specific content. In one embodiment, the content may include different types of data sources. For example, the content may be a web page, a shell folder, a navigation based application, and the like.

The application 122 receives the user 102's instructions to generate a tab control, and at step 204, the application 122 presents a tab control with multiple tabs to the user 102. In an embodiment, the user 102 communicates instructions to the application 122 to create a tab control. In certain embodiments, the user 102 can specify certain tab attributes for the tab control. Such tab attributes include size of the tab control, number of tabs, icons for the tabs, text direction, etc.

The tab control includes at least one normal tab and at least one special tab. Normal tabs include labels that are descriptive and identify and designate the information associated with the tab. For example, labels associated with normal tabs include "First," "Second," "Option 1," "Option 2," "New Line," "Return," "Monday," and "Tuesday." The special tab, on the other hand, includes a text label that is non-descriptive. By "non-descriptive" is meant that the label does not identify or designate content, and suggests that the label is to be user defined. Labels associated with the special tab include "Other," "?," and "Blank."

At step 206, the user 102 selects a special tab. For example, the user 102 may move a pointer or cursor over the special tab and press or click the tab. The user 102 may also use his or her finger on a touch screen device to touch the special tab.

When the normal tabs are pressed, they act like radio buttons so that only one tab can be pressed at a time. On the other hand, when the special tab is selected (while the normal tabs are deselected), at step 208, the special tab morphs or changes into a text field. In some embodiments, the special tab shows a pressed state momentarily and then changes into a text field. For example, the special tab can be temporarily highlighted and turn to a selection color (e.g., blue). In other embodiments, the text field reveals an I-beam cursor or pointer to prompt the user 102 to type text in the text field. In yet other embodiments, command text appears in the background of the special tab like "Type Here" or "Type Value Here."

At step 210, the user 102 enters text in the text field of the special tab. In various embodiments, the user 102 types text. In other embodiments, the user 102 speaks the text, and the text is entered into the text field. The text is typically descriptive. For example, the user 102 may type a specific value, text, or option in the text field. The special tab can indicate different categories or subjects, such as "General," "Project A," "Project B," "Personal," "Address," or "Education." The special tab can also indicate different functions, such as "World Clock," "Alarm," "Stopwatch," "Timer," or "Search." In certain embodiments, the application 122 can autofill or suggest the text based on what the user 102 has typed before or the context of the tab control.

At step 212, the application 122 records the text for the special tab. If the user 102, however, decides to change the text in the special tab, the user 102 can type different text by reselecting the special tab to re-enter edit mode. In some embodiments, the user 102 selects a normal tab. When the user 102 selects the normal tab, the special tab reverts back to its default text (e.g., "Other"). The user 102 may then repeat the process to enter text in the special tab.

FIGS. 4A-4E are exemplary screenshots that show the different steps in method 200 when used to configure a segment in a segmented control. FIG. 4A is an exemplary screenshot 400 of a display or screen of a segmented control having multiple segments. Normal segments 404 include text labels that are descriptive—"New Line," "Return," and "None," As shown, special segment 406 is the rightmost segment and includes the non-descriptive text label "Other." Positioning the special segment 406 all the way to the right helps the user 102 find the special segment quickly and easily. In addition, the more frequently used segment choices are generally on the left of the segmented control.

Figure 4B:
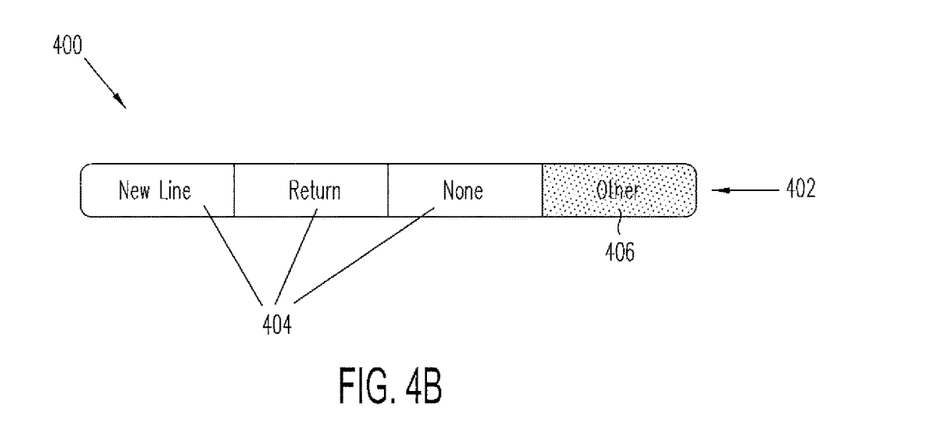

FIG. 4B illustrates an exemplary screenshot 400 of a display or screen when the user 102 selects the special segment 406. As shown, when the special segment 406 is selected, the special segment 406 is temporarily highlighted or turns to a selection color. The special segment 406 then changes into a text field.

Figure 4C:
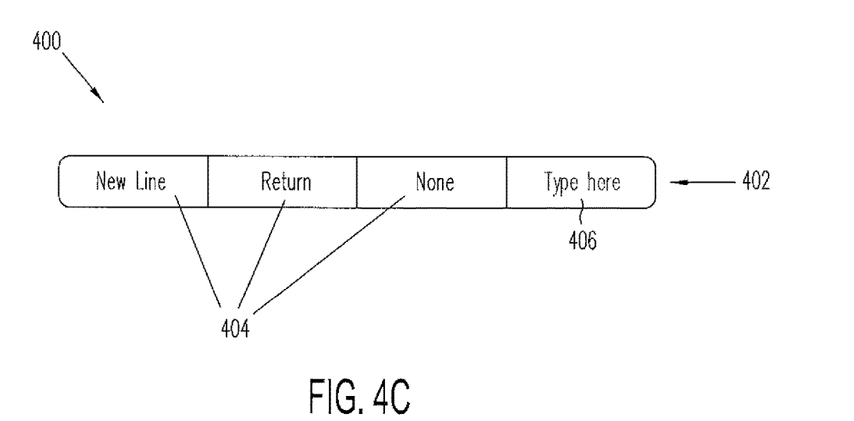

FIG. 4C illustrates an exemplary screenshot 400 of the display or screen that shows that the special segment 406 is transformed into a text field and displays command text in the background of the special segment 406. In the embodiment shown, the command text is "Type here" to prompt the user 102 to type a value or text into the special segment 406.

Figure 4D:
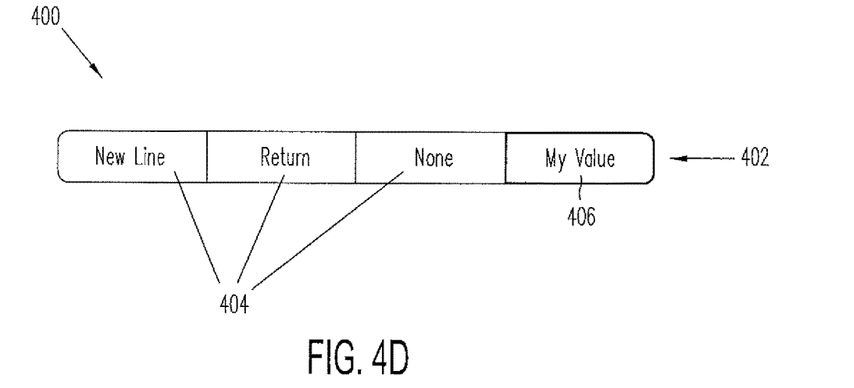

FIG. 4D illustrates an exemplary screenshot 400 of a display or screen when the user 102 types in a value in the special segment 406. As shown the value is "My Value." This is the value that is recorded for the special segment 406.

Figure 4E:
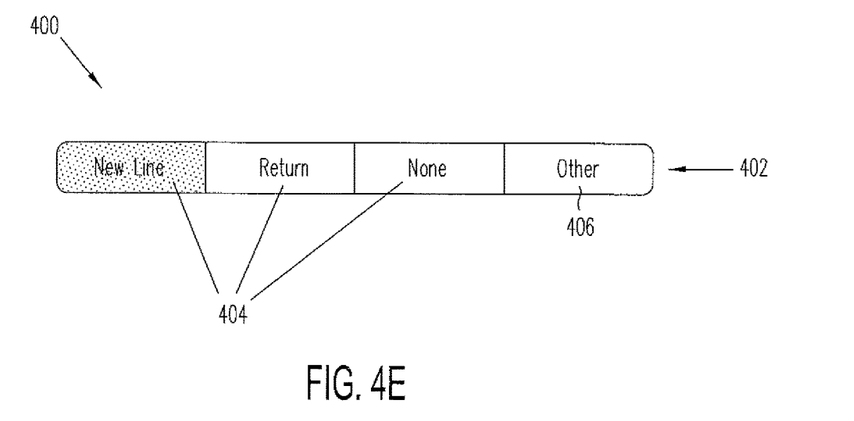

FIG. 4E illustrates an exemplary screenshot 400 of a display or screen when the user 102 decides to change the text in the special segment 406. In this embodiment, the user 102 selects a normal segment 404 to view data corresponding to the normal segment 404. Here the "New Line" segment 404 is highlighted to indicate that it has been pressed or clicked. When the normal segment 404 is clicked, the special tab 406 reverts or changes back to the "Other" value. From there, the user 102 may repeat the process described above to change the text in the special segment 406. In other embodiments (not shown), the user can simply select the special segment 406 to change the text.

Various methods and systems for configuring a tab in a tab control have been described. The tab control includes at least one special tab that changes into a text field so that a user can enter text directly in the special tab. This provides a cleaner, uncluttered user interface.

Figure 5:
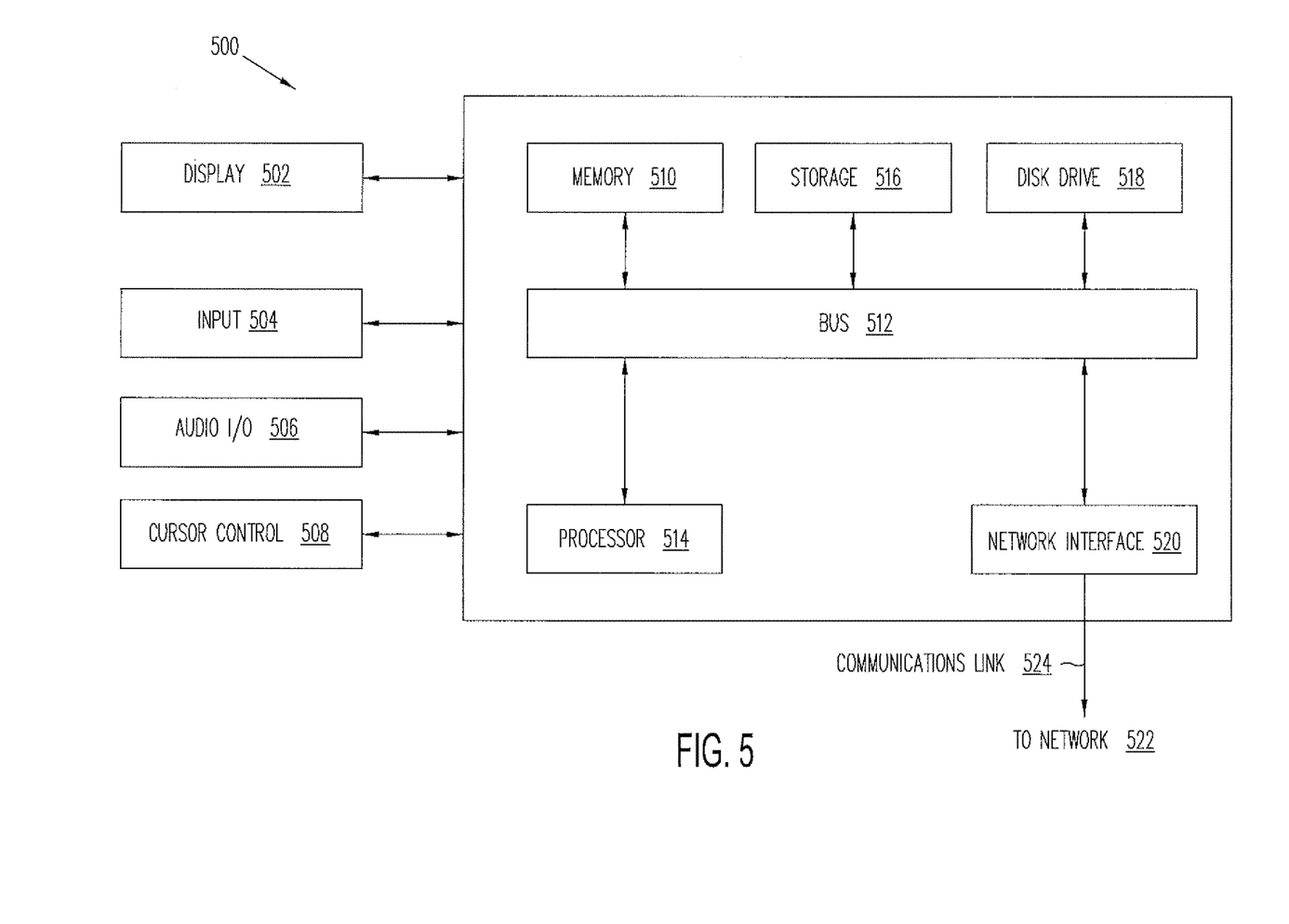
FIG. 5 is a block diagram of a system for implementing a device according to an embodiment of the present disclosure.

FIG. 5 is a block diagram of a computer system 500 suitable for implementing one or more embodiments of the present disclosure, including the user device 120 and the server 180. In various implementations, the user device 120 may comprise a mobile cellular phone, personal computer (PC), laptop, wearable computing device, etc. adapted for wireless communication, and the server 180 may comprise a network computing device, such as a server. Thus, it should be appreciated that the devices 120 and 180 may be implemented as computer system 500 in a manner as follows.

Computer system 500 includes a bus 512 or other communication mechanism for communicating information data, signals, and information between various components of computer system 500. Components include an input/output (I/O) component 504 that processes a user action, such as selecting keys from a keypad/keyboard, selecting one or more buttons, tabs, segments, or links, typing text into a text field, etc., and sends a corresponding signal to bus 512. I/O component 404 may also include an output component, such as a display 502 for presenting a tab control and a cursor control 508 (such as a keyboard, keypad, mouse, etc.) that can be used to select and press tabs. An optional audio input/output component 506 may also be included to allow a user to use voice for inputting information by converting audio signals. Audio I/O component 506 may allow the user to hear audio. A transceiver or network interface 520 transmits and receives signals between computer system 500 and other devices, such as another user device via network 522. In one embodiment, the transmission is wireless, although other transmission mediums and methods may also be suitable. A processor 514, which can be a micro-controller, digital signal processor (DSP), or other processing component, processes these various signals, such as for display on computer system 500 or transmission to other devices via a communication link 524. Processor 514 may also control transmission of information, such as cookies or IP addresses, to other devices.

Components of computer system 500 also include a system memory component 510 (e.g., RAM), a static storage component 516 (e.g., ROM), and/or a disk drive 518. Computer system 500 performs specific operations by processor 514 and other components by executing one or more sequences of instructions contained in system memory component 510. Processor 514, in various embodiments, presents a tab control with multiple tabs, including a normal and special tab, changes the special tab into a text field, and displays the special tab with the text.

Logic may be encoded in a computer readable medium, which may refer to any medium that participates in providing instructions to processor 514 for execution. Such a medium may take many forms, including but not limited to, non-volatile media, volatile media, and transmission media. In various implementations, non-volatile media includes optical or magnetic disks, volatile media includes dynamic memory, such as system memory component 510, and transmission media includes coaxial cables, copper wire, and fiber optics, including wires that comprise bus 512. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

In view of the present disclosure, it will be appreciated that various methods and systems have been described according to one or more embodiments for configuring a tab in a tab control.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a memory; and
one or more processors in communication with the memory and operable to:
present a tab control tool including multiple tabs stored on a server in response to providing an electronic form comprising a plurality of pages, the tab control tool comprising a first descriptive label and a non-descriptive label and corresponding to the pages of the electronic form;
associate a transformable tab with the non-descriptive label, wherein the non-descriptive label is devoid of data content of the corresponding page and is adapted to be transformed by a user to a second descriptive label by editing the non-descriptive label;
responsive to the user selecting the transformable tab having the non-descriptive label, change the non-descriptive label of the transformable tab into an editable text field tab that prompts the user to type text into the editable text field tab;
responsive to the user entering text in the editable text field tab, change the text into the entered text so that the transformable tab displays the entered text; and
responsive to the user selecting a tab having the first descriptive label after the transformable tab displays the entered text, revert the entered text of the transformable tab to the non-descriptive label, wherein the tab having the first descriptive label is different from the transformable tab.

2. The system of claim 1, wherein the transformable tab is the rightmost tab in the tab control.

3. The system of claim 1, wherein the one or more processors are further operable to highlight the transformable tab temporarily to show a pressed state when the user selects the transformable tab.

4. The system of claim 1, wherein the one or more processors are further operable to reveal an I-beam in the text field.

5. The system of claim 1, wherein the one or more processors are further operable to record the text in the transformable tab.

6. A method for configuring a tab in tab control, comprising:
presenting, by one or more processors, a tab control tool stored on a server in response to providing an electronic form comprising a plurality of pages, the tab control tool including a first tab having a first descriptive label and at least one transformable tab having a non-descriptive label and corresponding to the pages of the electronic form;
associating a transformable tab with the non-descriptive label, wherein the non-descriptive label is devoid of data content of the corresponding page and is adapted to be transformed by a user to a second descriptive label by editing the non-descriptive label;
responsive to the user selecting the transformable tab having the non-descriptive label, changing, by the one or more processors, the non-descriptive label of the transformable tab into an editable text field tab that prompts the user to type text into the editable text field tab;
responsive to the user typing text in the editable text field tab, changing, by the one or more processors, the text into the entered text so that the transformable tab displays the entered text; and
responsive to the user selecting the first tab having the first descriptive label after the transformable tab displays the entered text, reverting the entered text of the transformable tab to the non-descriptive label.

7. The method of claim 6, further comprising highlighting the transformable tab to indicate that the transformable tab has been selected.

8. The method of claim 6, further comprising recording the text in the transformable tab.

9. A non-transitory machine-readable medium comprising instructions which, in response to a computer system, cause the computer system to perform a method comprising:
presenting a tab control tool including multiple tabs stored on a server in response to providing an electronic form comprising a plurality of pages, the tab control tool comprising a first descriptive label and a non-descriptive label and corresponding to the pages of the electronic form;
associating a transformable tab with the non-descriptive label, wherein the non-descriptive label is devoid of data content of the corresponding page and is adapted to be transformed by a user to a second descriptive label by editing the non-descriptive label;
responsive to the user selecting the transformable tab having the non-descriptive label, changing the non-descriptive label of the transformable tab into an editable text field tab that prompts the user to type text into the editable text field tab;
responsive to the user typing text in the editable text field tab, changing the text into the entered text so that the transformable tab displays the entered text; and
responsive to the user selecting a tab having the first descriptive label after the transformable tab displays the entered text, revert the entered text of the transformable tab to the non-descriptive label, wherein the tab having the first descriptive label is different from the transformable tab.

10. The non-transitory machine-readable medium of claim 9, wherein the method further comprises highlighting the transformable tab temporarily to indicate that the transformable tab has been selected.

11. The non-transitory machine-readable medium of claim 9, wherein the method further comprises displaying the text in a background of the transformable tab.

12. The non-transitory machine-readable medium of claim 9, wherein the tab control comprises a segmented control.

* * * * *